United States Patent [19]

Hunter et al.

[11] 4,133,344

[45] Jan. 9, 1979

[54] POWER TRANSMISSION FOR SELF-PROPELLED IRRIGATION SYSTEM

[75] Inventors: Edwin J. Hunter, Rancho Santa Fe; Richard E. Hunter, Carlsbad, both of Calif.

[73] Assignee: The Toro Company, San Marcos, Calif.

[21] Appl. No.: 694,904

[22] Filed: Jun. 10, 1976

[51] Int. Cl.$^2$ ............................................. B05B 3/00
[52] U.S. Cl. .................................... 137/344; 74/768; 74/785; 74/801; 239/177
[58] Field of Search .............. 180/70 R, 14 R, 43 B; 239/177, 212, 213; 74/768, 769, 785, 801, 802; 137/344

[56] References Cited

U.S. PATENT DOCUMENTS

| | | | |
|---|---|---|---|
| Re. 28,727 | 3/1976 | Reinke | 239/177 |
| 694,370 | 3/1902 | Gill | 74/802 X |
| 1,632,571 | 6/1927 | Watson | 74/802 X |
| 2,564,271 | 8/1951 | Millns | 74/785 |
| 2,583,140 | 1/1952 | Else | 74/785 X |
| 3,115,204 | 12/1963 | Dence | 74/785 |
| 3,662,776 | 5/1972 | Bryant et al. | 239/212 X |
| 3,771,719 | 11/1973 | Raso et al. | 239/177 |
| 3,944,007 | 3/1976 | Thom et al. | 239/177 X |

*Primary Examiner*—John J. Love
*Attorney, Agent, or Firm*—Poms, Smith, Lande & Glenny

[57] ABSTRACT

A self-propelled center pivot irrigation system has individual span units each one of which has at least one or more fluid conduits, and at least one or more power frames for propelling the span unit, each power frame has at least one or more drive wheels, a drive motor, and transmission means connecting the drive motor to the drive wheels to transmit power from the drive motor to the drive wheels, the transmission means has an input drive gear, intermediate planetary gear speed reduction means and an output shaft for connection between the drive motor output shaft and the power frame drive wheels to provide a low friction, speed reducing, torque increasing drive for the power frame drive wheels from the drive motor.

1 Claim, 7 Drawing Figures

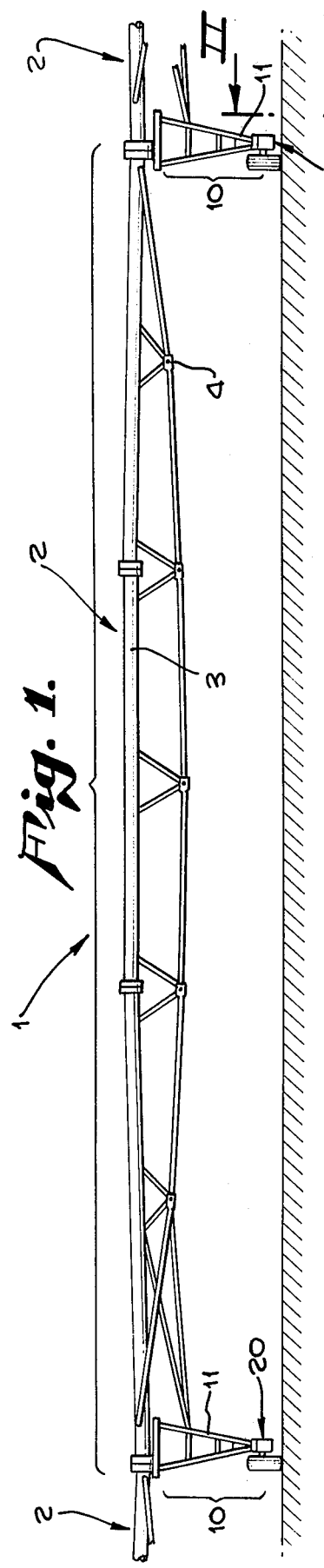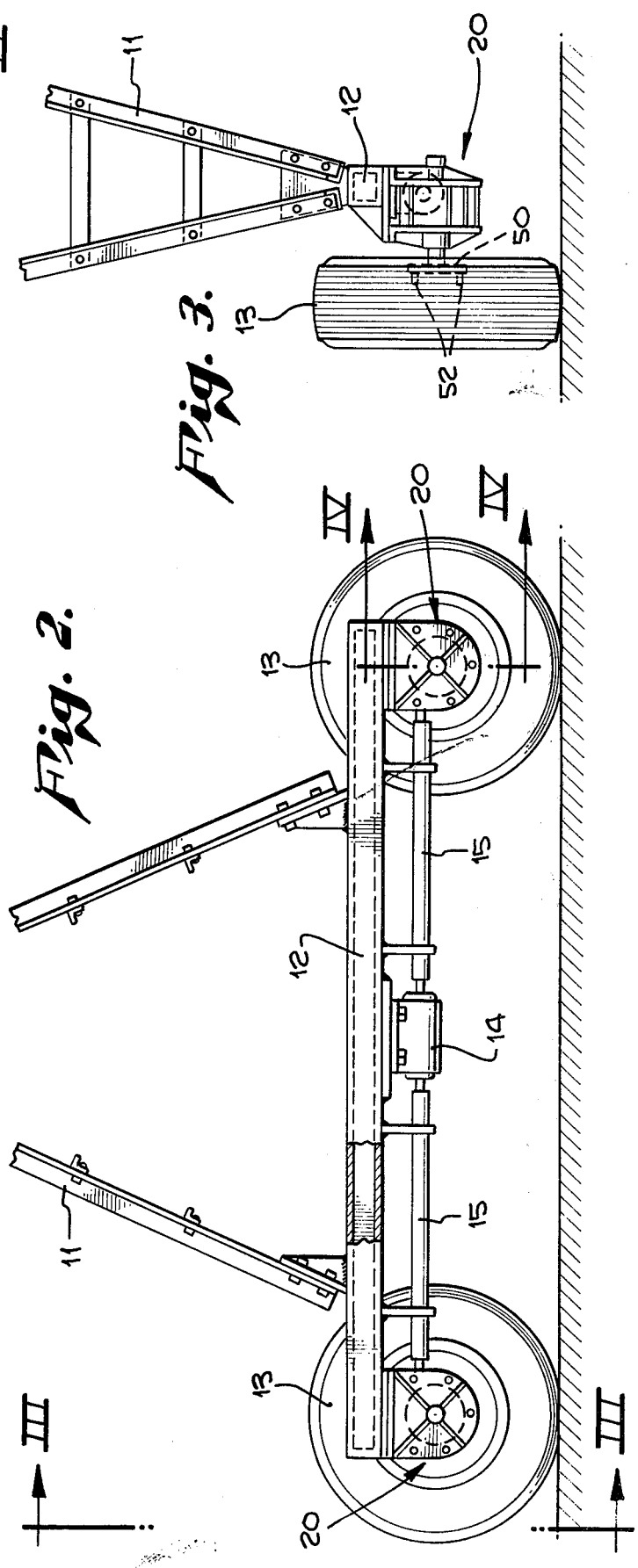

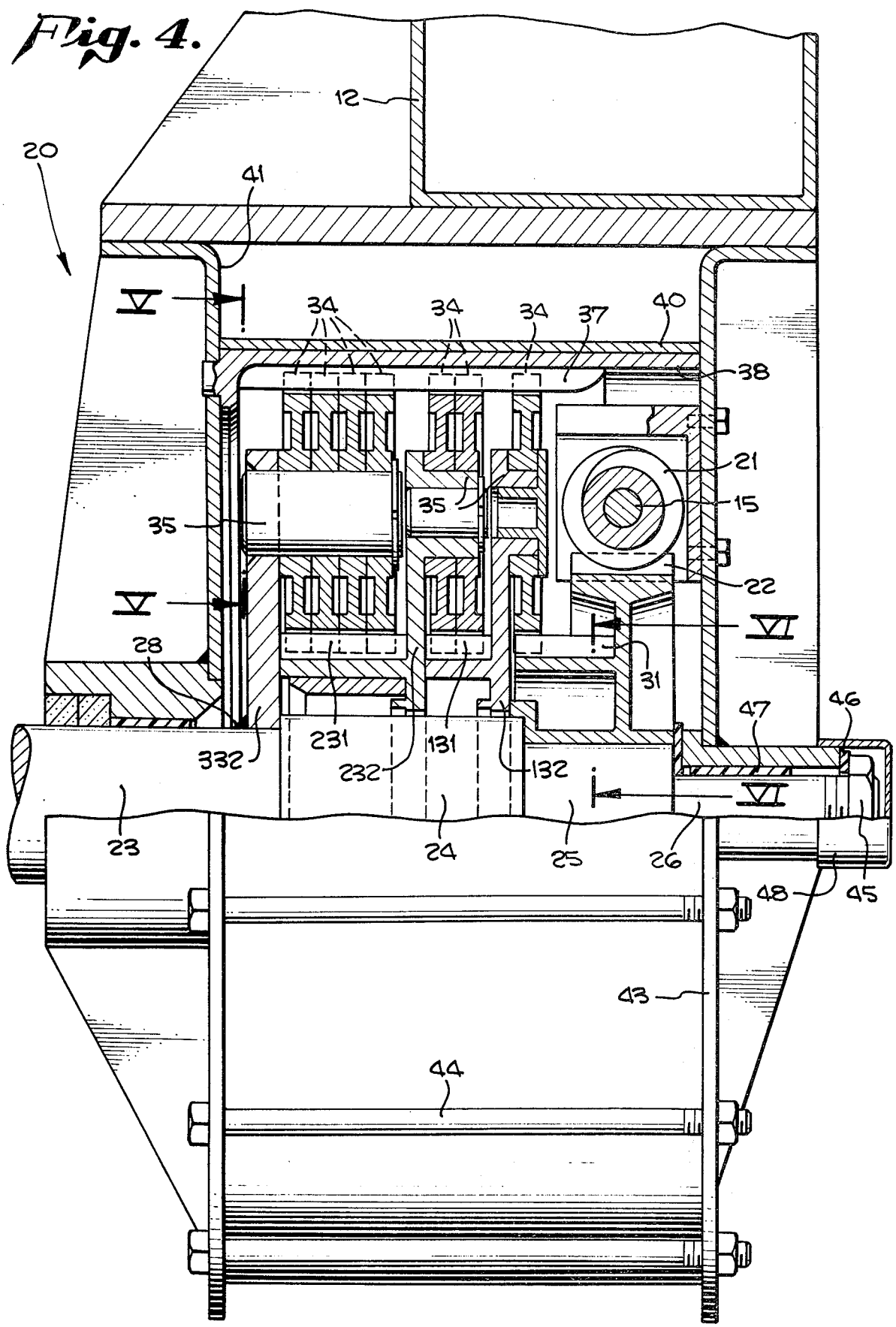

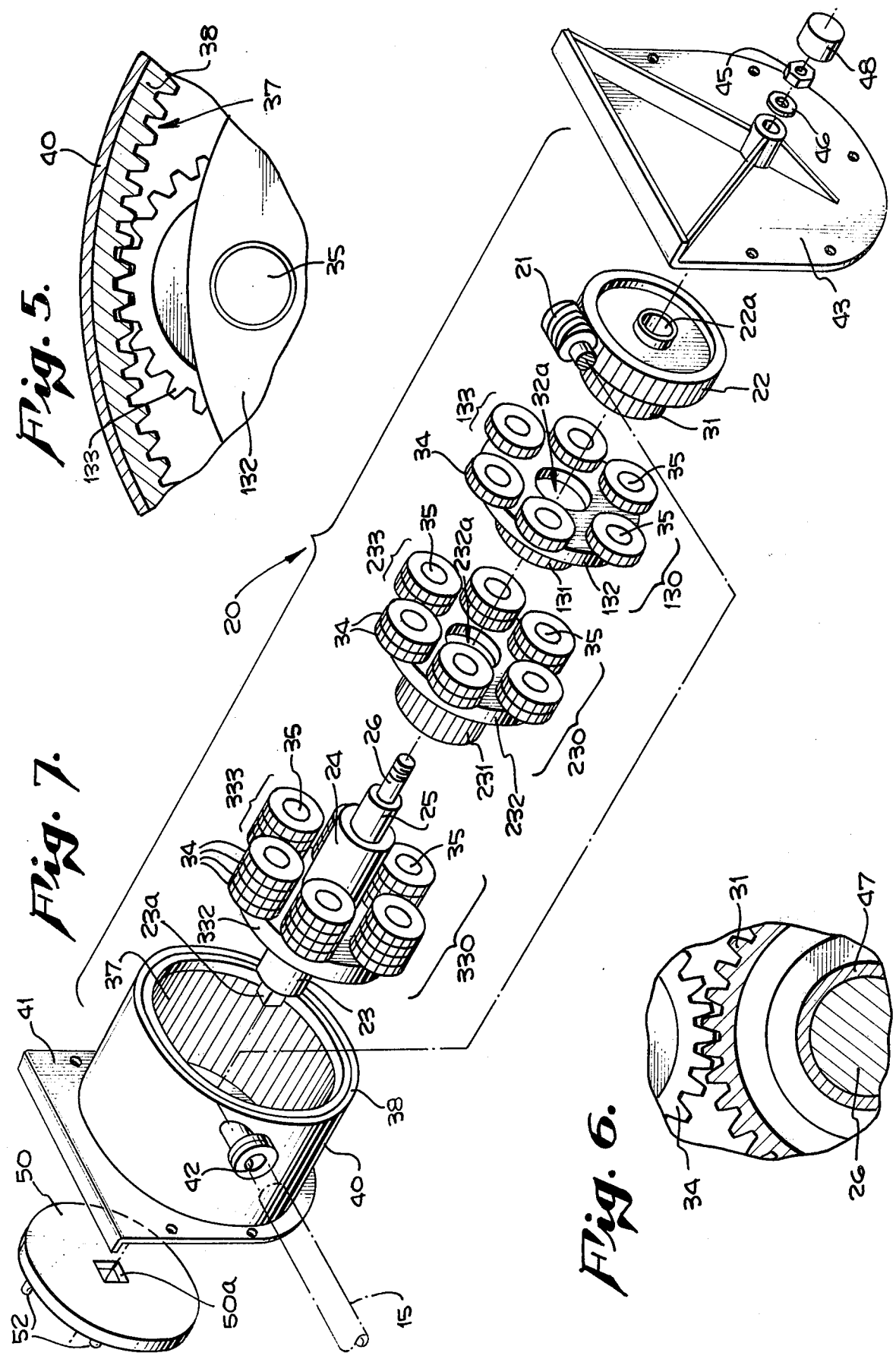

POWER TRANSMISSION FOR SELF-PROPELLED IRRIGATION SYSTEM

BACKGROUND OF THE INVENTION

The present invention relates in general to self-propelled center pivot irrigation systems which are comprised of individual span units, each span unit having a power frame for propelling the span unit and each power frame having drive motor, drive wheels and transmission means which connects the drive motor to the drive wheels and transmits power from the drive motor to the drive wheels. In particular, the present invention relates to the power transmission means.

Heretofore, it has been common in transmissions for center pivot irrigation systems to utilize a double worm gear power transmission between the drive motor and the drive wheel. This transmission was connected either directly to the drive wheel or was connected to a sprocket and drive chain assembly which in turn was connected to the drive wheel.

It has been found in these prior embodiments that worm driven reduction gears are subject to extremely high frictional losses at a low RPM. The use of double worm reduction gearing in the conventional transmission means results in severe power losses due to friction at low RPM's. Further, at low speeds and under heavy load, worm gear assemblies have a tendency to force the lubricant from between the intermeshing gears and tend to run dry. This necessitates the use of excessive lubricant in order to assure adequate lubrication. This is specifically disadvantageous in the rural environment in which the transmission means is specifically applied, as the excess lubricant entraps substantial amounts of dirt, dust and abrasive material which is constantly being stirred up by the action of the drive wheels in the loose dirt in an agriculture field.

Due to the nature of the environment in which the transmission is used, the transmission most frequently operates in the low RPM, high load condition. Self-propelled irrigation systems also generally operate in an on/off mode. The individual drive wheels are continuously stopped and restarted and with each restart the transmission begins operation in a low RPM, high load condition. Specifically, the high frictional losses inherent in a double worm reduction coupled with the loss of lubricant due to the pressure between a worm and a worm gear in a low RPM, high load condition combine to require the use of excessive amounts of drive power. Additionally, the problem of lubricant being forced from between the worm and worm gear tends to produce a potential for running without lubricant and hence shortening the operating life.

SUMMARY OF THE INVENTION

It is therefore the primary object of the present invention to disclose and provide an improved transmission means which is not subject to large frictional losses at a low operating speed and under conditions of high load.

It is a further object of the present invention to disclose and provide an improved transmission which is less likely to be inadequately lubricated.

Generally stated, the present invention in an improved power transmission means includes the provision of planetary gear means which is operationally interconnected to an input drive gear for converting power from a drive motor which has a low torque component and a high rotational velocity component to power having a high torque component and a lower rotational velocity component at an output of the power transmission means. A sequential series of operationally interconnected individual planetary gear assemblies is provided, each comprising planet gears mounted on a planetary carrier with an associated sun gear. In an initial one of the individual planetary gear assemblies, the input drive power is provided by a sun gear which is attached to and driven by an input drive gear. This initial sun gear intermeshes with and drives the planet gears of the initial planetary gear assembly. The sun gear of the initial planetary gear assembly is connected to and driven by the planetary carrier of the initial planetary gear assembly and intermeshes with and drives the planet gears of the next one of the individual planetary gear assemblies in the sequential series. Each subsequent individual planetary gear assembly in the series is driven by the sun gear of the immediately preceeding assembly in the series. Each one of the individual planetary gear assemblies provides a torque increasing speed reducing power conversion and is subjected to lower frictional losses than a worm gear at low speed and under high load. The potential for forcing the lubricant from between intermeshing surfaces is also greatly reduced.

Additionally, the planetary gear means of the present invention may comprise individual planetary gear assemblies having planet gears comprising gear segments of a thermoplastic material which is self-lubricating, thereby furthering the objects of the present invention by reducing the need for additional lubrication and providing a load equalizing effect of the segmented gear teeth.

A more complete understanding of the improvements in transmission means in accordance with the present invention, as well as a recognition of additional objects and advantages therefor, will be afforded to those skilled in the art from a consideration of the following detailed description of an exemplary embodiment thereof. Reference will be made to the appended sheets of drawings which will first be discussed briefly.

BRIEF DESCRIPTION OF THE DRAWINGS

FIG. 1 shows a portion of a self-propelled center pivot irrigation system which utilizes the improved transmission means of the present invention;

FIG. 2 is a partial side sectional view taken through the plane II—II of FIG. 1 of a power frame of a self-propelled center pivot irrigation system, showing drive motor, drive shafts, drive wheels and the improved transmission means of the present invention;

FIG. 3 is a partial end view of the power frame of FIG. 2 taken through the plane III-III showing the relationship between the transmission means of III—III present invention and the drive wheel;

FIG. 4 is a partial sectional view of the improved transmission means of the present invention taken through the plane IV—IV of FIG. 2;

FIG. 5 is a partial end sectional view taken through the plane V—V of FIG. 4 showing the operational interaction between the planet gears and the planetary housing;

FIG. 6 is a partial side sectional view taken through the plane VI—VI of FIG. 4 showing in detailed the interaction between the planet gears and a sun gear; and FIG. 7 is an exploded view in perspective, of the improved transmission means of the present invention.

DETAILED DESCRIPTION OF AN EXEMPLARY EMBODIMENT

Referring initially to FIG. 1, a portion of a self-propelled center pivot irrigation system is shown generally at 1 which comprises individual span units 2 having a fluid conduit 3 and a conduit supporting truss assembly indicated generally at 4 supported between power frames 10 which propel the individual span units and thence the entire center pivot irrigation system.

Each power frame 10 has one or more drive wheels 13, a drive motor 14, drive shaft members 15 and transmission means 20 attached to wheel truck 12 as best shown in FIG. 2. Wheel truck 12 is attached to carriage frame 11 which in turn supports the connection between individual span units 2 as is shown in FIG. 1.

Transmission means 20 connects drive wheels 13 to drive shaft 15 and thence to drive motor 14 to transmit power from drive motor 14 to drive wheels 13 as is shown in FIGS. 2 and 3.

Transmission means 20, as seen in FIGS. 4 and 7, generally comprises an outer transmission housing 40 with a mounting flange 41 and a drive shaft aperture 42 which receives drive shaft 15 from drive motor 14. An end plate 43 is fastened to mounting flange 41 by means of cross bolts 44 thereby enclosing the transmission. Fastening means 45 are provided to retain journal 26 of main shaft 23 within aperture 49 of end plate 43. Thrust washer 46 provides a bias pressure against fastening means 45 to prevent fastening means 45 from being vibrated loose. Fastening means 45 and thrust washer 46 are protected by shaft end cover 48.

As particularly contemplated in the present invention, transmission means 20 is provided with an improved planetary gear speed reduction means indicated generally at 30 which operationally interconnects with input drive gear 22 for converting power from drive motor 14 having a low torque component and high rotational velocity component to power having a relatively higher torque component and a relatively lower rotational velocity component at the output main shaft 23 of transmission 20. Additionally, a thrust flange of bearing insert 47 retains input drive gear 22 in a uniform contact interrelation with the planetary gear means indicated generally at 30.

In the present exemplary embodiment of this invention, power from drive motor 14 rotates drive shaft 15 which is non-rotatably affixed to a worm 21. Worm 21 intermeshes with input drive gear 22 which, contrary to usual practice, is a helical gear as opposed to the use of a "worm gear" having curved teeth.

The use of a helical input drive gear 22 obviates the problem of precise axial alignment of worm 21 and input drive gear 22 which would arise in using the standard worm gear configuration of input drive gear.

Although a standard worm gear theoretically will carry a higher load than a helical gear in standard applications, in the environment where the present invention in improved power transmission is used, stresses are likely to arise which will cause misalignment of worm 21 and input drive gear 22. When this occurs, the load carrying ability of a standard worm gear having curved teeth is drastically reduced.

The helical gear/worm combination of the present invention is not sensitive to the axial positioning of worm 21 relative to input drive gear 22. Further, it is not critically affected by any distortion of the elements of the combination under load. This allows much wider tolerances on the various elements than is possible with a conventional combination of worm and worm gear, resulting in greatly simplified assembly and a substantial manufacturing cost reduction.

It should be noted that the load carrying capacity may be increased by making the worm 21 and helical input drive gear 22 slightly larger. The cost increase is slight when compared to the savings in assembly cost, and there is adequate room for such enlarged parts within a standard transmission housing 40.

The planetary gear speed reduction means of the present invention includes a plurality of individual planetary gear assemblies 130, 230 and 330, respectively, which are operationally interconnected in a sequential series as is best seen in FIGS. 4 and 7.

The individual planetary gear assemblies 130, 230 and 330 as best seen in FIG. 7, are coaxially aligned within transmission housing 40 by planetary journal 24 of main shaft 23 which passes through central apertures 132a, 232a and 332a of planetary carriers 132, 232 and 332.

Sun Gear 31 is connected to and driven by input drive gear 22 and, in fact, is formed integrally with input drive gear 22, as best seen in FIGS. 4 and 7. In the exemplary embodiment, sun gear 31 intermeshes with a plurality of planet gears 133 of an initial individual planetary gear assembly 130 which are rotatably mounted on planetary carrier 132, as is shown in FIG. 6. Planetary carrier 132 is provided with a central aperture 132a which receives planetary journal 24 of main shaft 23. Planetary carrier 132 is rotatably mounted to journal 24 which aligns planetary carrier 132 within planetary housing 38.

As sun gear 31 rotates, planet gears 133 are driven by sun gear 31. Due to the intermeshing interaction between sun gear 31 and planet gears 133, as sun gear 31 rotates, planet gears 133 also rotate. Planet gears 133, in addition to intermeshing with sun gear 31, also intermesh with internal gear surface 37 of planetary housing 38 as best seen in FIG. 5. Upon rotation, planet gears 133 precess about the interior gear surface 37 of planetary housing 38. As a result of this precession of planet gears 133, planetary carrier 132 is rotated about journal 24 within planetary housing 38. In an actual reduction to practice of the exemplary embodiment shown, the speed reduction ratio used between worm 21 and input drive gear 22 is about 48 to 1, the speed reduction ratio between input drive gear 22 and sun gear 31 is exactly 1 to 1 and the ratio between sun gear 31 and sun gear 131 is preferably about 3.56 to 1. The resulting speed reduction ratio between worm 21 and sun gear 131 is then preferably approximately 171 to 1.

Sun gear 131 is coaxially aligned with and attached to planetary carrier 132. In the exemplary embodiment, sun gear 131 is formed integrally with planetary carrier 132. As planetary carrier 132 rotates within planetary housing 38, sun gear 131 is rotated, (FIGS. 4 and 7). Sun gear 131 intermeshes with a plurality of planet gears 233 rotatably mounted to planetary carrier 232 of planetary gear assembly 230. This intermeshing allows sun gear 131 to drive plant gears 233 thereby causing the rotation of planetary carrier 232 with respect to journal 24 and planetary housing 38. Sun gear 231 is connected to and integrally formed with planetary carrier 232 and rotates with planetary carrier 232. In the aforesaid actual reduction to practice of the exemplary embodiment, the speed reduction ratio between sun gear 131 and gun gear 231 is preferably about 3.56 to 1 resulting in a total speed reduction ratio between worm 21 and sun gear 231 of approximately 610 to 1.

As contemplated by the present invention, and as best seen in FIGS. 4 and 7, a plurality of gear segments 34 are combined to form each of the planet gears 233 of planetary gear assembly 230. As is specifically contemplated by the present invention, the planet gears 233 and 333 of each succeeding one of the sequential series of individual planetary gear assemblies 230 and 330 respectively are comprised of a larger number of gear segments 34 than the planet gears of each preceding planetary gear assembly within the sequential series.

In the exemplary embodiment of the present invention, planet gears 133 are each comprised of one gear segment 34, planet gears 233 are each comprised of two gear segments 34 and planet gears 333 are each comprised of four gear segments 34.

As is readily apparent, the utilization of gear segments allows some compensation within the planet gears themselves for any irregularities within the gear surface 37 of planetary housing 38, any slight mismatch between the sun gear and the gear surface 37 of planetary housing 38 or any errors in alignment of the planet gear journals 35 upon which the planet gears are rotatably mounted. This results in a more uniform load distribution and transfer between the sun gear which is driving the planet gears and the planetary housing. Additionally, the planet gear surface area may increased as required by increases in the load upon the planet gear merely by the expedient of adding additional standard gear segments.

Sun gear 231 intermeshes with a plurality of planet gears 333 rotatably mounted to planetary carrier 332 of planetary gear assembly 330. Again, as in preceding planetary gear assemblies within the sequential series, this intermeshing of a sun gear 231 of one assembly 230 with the planet gears 333 of a subsequent assembly 330 within the series, results in a rotation of the planetary carrier 332 of the subsequent assembly. The speed reduction ratio between sun gear 231 and planetary carrier 332 is 3.56 to 1 resulting in a total speed reduction ratio of 2160 to 1 between worm 21 and planetary carrier 332.

Contrary to planetary carriers 132 and 232, planetary carrier 332 is firmly, non-rotatably attached to journal 24 and main shaft 23. In the exemplary embodiment as seen in FIG. 4, the terminal planetary carrier 332 is welded to main shaft 23 at 28. Thus, it may be seen that any rotation of planetary carrier 332 will result in a 1 to 1 rotation of main shaft 23.

Main shaft 23 is provided with a spline portion 23a which is keyed into aperture 50a of wheel flange 50 thus providing a non-rotatable connection between wheel flange 50 and transmission main shaft 23. Drive wheels 13 are attached to wheel flange 50 by bolts 52 or the like whereby, any rotation of main shaft 23 results in a 1 to 1 rotation of drive wheels 13.

In the exemplary embodiment of the present invention the individual planetary gear assemblies may be constructed of a thermoplastic material which is self-lubricating and resilient. Further advantages of using individual planetary gear assemblies constructed of a self-lubricating thermoplastic material are lighter weight, lower costs and quieter operation when compared with planetary gear assemblies constructed of a metallic material.

Having thus described an exemplary embodiment of an improved power transmission for a self-propelled center pivot fluid distribution and irrigation system, it should be understood by those skilled in the art that various alternatives and modifications thereof may be made within the scope and spirit of the present invention which is defined by the following claims.

I claim:

1. In a center pivot irrigation system including a plurality of articulated span units each rotating about a center pivot on drive wheels driven by a drive motor through a transmission, the improvement comprising:
    (a) the transmission comprising a series of individual planetary gear assemblies operationally mounted within a housing and interconnected in series to provide successive steps of torque increase and speed reduction between an input to and an output from the transmission, each of said planetary gear assemblies comprising planet gears of a self-lubricating thermoplastic material mounted on a planetary carrier with an associated sun gear, said planet gears of at least all said assemblies after the first of said series each comprising a plurality of gear segments rotatably mounted on a common shaft carried by said connector whereby the operational loading forces imposed on each of said segmented planet gears is equally proportionally distributed to each of said gear segments, said planet gears of each of said series of assemblies being comprised of a greater number of said segments than the next preceding of said assemblies of said series and all said segments being of substantially the same thickness whereby said planet gears of each of said series of assemblies are provided with an increased surface area as compared to the next preceding of said assemblies of said series; and,
    (b) means for absorbing misalignment stresses disposed between said input of the transmission and the first of said series of assemblies comprising:
        (1) a worm driven by said input of the transmission; and,
        (2) a helical gear driven by said worm and connected to drive the first of said series of assemblies.

* * * * *